United States Patent Office 3,067,628
Patented Dec. 11, 1962

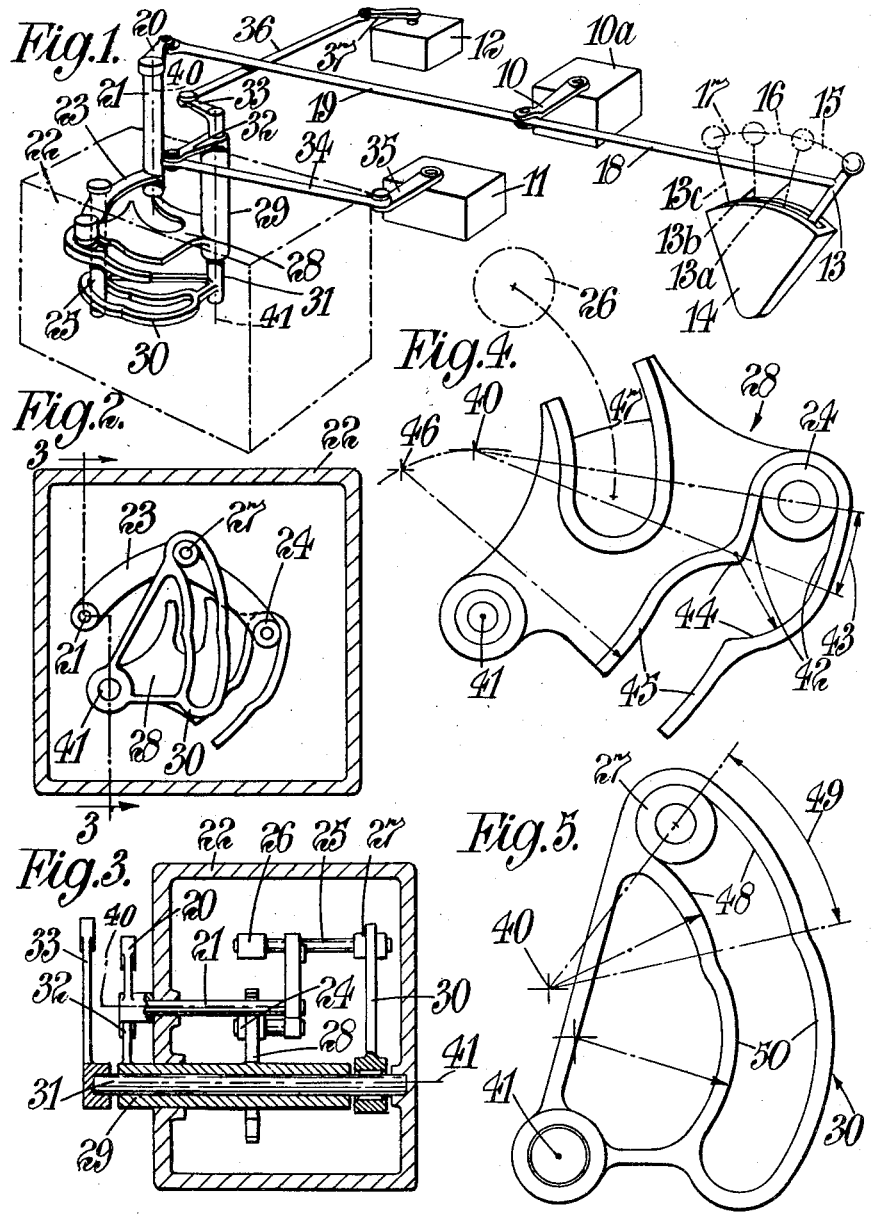

3,067,628
AIRCRAFT ENGINE CONTROL MECHANISMS
Lionel Haworth, Woodhouse Eaves, Loughborough, Kenneth Arnold Basford, Alvaston, Derby, Philip Burrows Smith, Mickleover, Derby, and Harry Simister Bottoms, Birmingham, England, assignors to Rolls-Royce Limited, Derby, England, a British company, and Joseph Lucas (Industries) Limited, Birmingham, England, a British company
Filed July 9, 1959, Ser. No. 826,005
Claims priority, application Great Britain July 15, 1958
2 Claims. (Cl. 74—471)

This invention comprises improvements in or relating to aircraft engine control mechanisms.

An aircraft engine has associated with it a multiplicity of controls or devices which must be adjusted or set when operating the engines and it is the usual practice to provide in the aircraft cockpit separate control levers for making the necessary adjustments or settings. With multi-engined aircraft therefore the total number of levers is large so that the layout of the aircraft cockpit is very complicated.

It is an object of this invention to enable the layout of a cockpit to be simplified.

Now a number of the controls or devices are required to be actuated only when starting up an engine or when closing down the engine, and such controls or devices are normally actuated in a particular sequence.

According to the invention, the number of control levers required for an engine is reduced by providing a single control lever for adjusting or setting a number of controls or devices which are required to be operated in sequence, the lever having successive ranges of movement allocated respectively to the controls or devices, and the lever being connected with the controls or devices by a mechanical mechanism adapted on movement of the lever in each of the ranges to cause actuation only of the control or device allocated to that range of movement.

According to a preferred feature of this invention, the lever is connected to the controls or devices through a cam arrangement comprising an arm rocked by adjustment of the lever, a separate rocking element for each of the controls or devices to be actuated, each such rocking element having a cam slot therein to be engaged by a corresponding roller on the arm, each cam slot having a portion or portions which when engaged by the corresponding roller are concentric with the axis of the arm and an operating portion which when traversed by the roller causes rocking of the element to actuate the associated control or device, the operating portions of the cam slots in the rocking elements being traversed by the corresponding rollers in succession. Each rocking element is connected to its associated control or device by a suitable mechanical linkage.

It will be clear that the control or device allocated to any range of movement of the control lever other than one end range must be of the type having two positions of adjustment only, for instance a fuel shut-off cock which is either open or closed, but the control or device allocated to said one end range may be one which is required to be set anywhere in a range of positions for instance a fuel trimming valve.

The control lever may also be employed to actuate a control or device including an adjusted part which, after being moved from its operative position, can be further moved without re-occupying its operative position.

One important application of the invention is to the controls of a propeller-driving gas-turbine engine and one arrangement of the invention applied to controls of such an engine will now be described by way of example. The description refers to the accompanying drawings in which:

FIGURE 1 is a diagrammatic perspective view of the arrangement,
FIGURE 2 is a plan view of part of FIGURE 1.
FIGURE 3 is a section on the line 3—3 of FIGURE 2,
FIGURE 4 is a plan view to a large scale of part of the arrangement, and
FIGURE 5 is a plan view to a large scale of another part of the arrangement.

A propeller-driving gas-turbine engine has, among other controls which are operated in sequence, a manual feathering lever 10 by the operation of which the normal propeller control unit 10a is over-ridden to cause the propeller to feather and which feathering lever 10 on starting up the engine is rendered inoperative, a shut-off cock 11 which at starting is opened to allow fuel to reach the engine and at shut down is closed to cut-off the fuel system from the engine, and a fuel trimmer control 12 which acts on the linkage between the pilot's fuel control lever and a throttle in the fuel system to vary the effect of the linkage and which is adjusted prior to take-off according to the ambient temperature conditions so that each setting of the pilot's throttle lever corresponds to a given power output of the engine irrespective of the ambient temperature.

The illustrated mechanism allows the three controls (FIGURE 1) to be actuated by a single lever 13 in sequence and allows the fuel trimmer control 12 to be set in any desired position in a range of settings.

The lever 13 works in a gate 14 and has three separate ranges of movement 15, 16, 17 allocated respectively to effect adjustment of lever 10, to actuate shut-off cock 11 and to set the fuel trimmer control 12.

The lever 13 is connected by a link 18 to the lever 10 and it is arranged that during the range of movement 15 of lever 13, the lever 10 is rocked sufficiently to render the feathering control through unit 10a inoperative. The lever 10 when operative, in a conventional manner activates a member to lift a valve controlling the supply of pressure liquid to the propeller increase-pitch line and counterclockwise movement of lever 13 in range 15 disengages the member from the valve and further movement through ranges 16 and 17 merely moves the member further from its operative position.

The lever 13 is connected by said link 18 and extension thereof 19 to an arm 20 secured on the input spindle 21 of a cam-box 22 containing individual mechanical motion transmitting mechanisms for the controls 11, 12.

The end of spindle 21 which projects within the cam-box 22 carries a curved arm 23 (FIGURES 1 to 3) carrying at its free end a first roller 24 and between its ends a transverse rod 25 on the ends of which are mounted rollers 26, 27.

The rollers 24, 26 co-operate with a rocking element 28 mounted on a sleeve 29 journalled in the cam-box 22 and the roller 27 co-operates with a rocking element 30 secured on a spindle 31 journalled coaxially within the sleeve 29. The sleeve 29 and spindle 31 project externally of the cam-box and have secured to them respectively linkage crank arms 32, 33. The arm 32 is connected by link 34 to operate crank lever 35 of the shut-off cock 11 and the arm 33 is connected by link 36 to operating crank lever 37 of the fuel trimmer unit 12.

The forms of the rocking elements 28 and 30 are shown in FIGURES 4 and 5 respectively and in each of these figures the pivotal axis of the spindle 21 is indicated at 40 and the rocking axes of the sleeve 29 and spindle 31 are indicated at 41.

The rocking element 28 has two cam slots one of which is engaged by projection of the roller 24 thereinto and one of which is engaged by projection of the roller 26 thereinto. The cam slot engaged by the roller 24 comprises a first portion 42 which is concentric with the axis 40 in the position of the rocking element 28 shown and this portion of the cam slot has an angular extent indicated by the arrows 43 equivalent to the angle through which the arm 23 rotates on movement of the lever 13 in the range of movement 15 (FIGURE 1). Thus whilst the lever 13 is moving from its full line position to the position indicated at 13a the roller moves along the cam slot portion 42 and the rocking element 28 is not displaced angularly. The cam slot engaged by the roller 24 also comprises a second portion 44 in which the radial distance of the sides of the slot from the axis 40 decreases and thus as the roller 24 moves over this portion 44 of the cam slot the rocking element 28 will be turned about its axis 41 so turning the sleeve 29 and operating the shut-off cock lever 35 through the parts 32 and 34.

The cam slot engaged by roller 24 also comprises a third portion 45 of circular arc form whereof the center is indicated at 46 and the position of the center 46 is selected so that on rocking of the element 28 as just described the center moves on a circular arc about axis 41 from the position shown until it is coincident with the axis 40 when clearly the portion 45 of the cam slot will become concentric with the axis 40 and movement of the roller 24 in engagement with this portion of the cam slot will not cause rocking of the element 28.

The roller 26 co-operates with a cam slot 47 which is of circular arc form about the center 46 and thus when the roller 24 engages the cam slot portion 45 the cam slot 47 will be concentric with the axis 40. It is arranged that the roller 26 engages the cam slot 47 as the roller 24 leaves the open end of the cam slot portion 45. The rollers 24 and 26 co-operate with the cam slot portion 45 and cam slot 47 respectively during movement of the lever 13 from the position 13b to the position 13c (FIGURE 1), the position 13b indicating the point at which the roller 24 leaves the cam slot portion 44 and enters the cam slot portion 45.

The rocking element 30 (FIGURE 5) has a cam slot with which the roller 27 co-operates and the cam slot comprises a first circular arc portion 48 which when the lever 13 is in the full line position shown in concentric with the axis 40 so that movement of the roller 27 in this cam track portion effects no rocking of the element 30. The angular extent of the circular arc cam slot portion 48 is indicated at 49 and corresponds to the angular movement of the arm 23 due to movement of the lever 13 from the full line position to the position indicated at 13b. Thus, during such movement of the lever 13 no adjustment is made of the fuel trimmer control 12.

The cam slot with which roller 27 co-operates also comprises a second portion 50 which is of any desired form to give the desired control of the fuel trimmer unit 12 and this cam slot portion 50 is engaged by the roller 27 when the lever 13 is moved in the range of movement 17 between positions 13b and 13c and since the cam slot portion 50 is not concentric with the axis 41 movement of the roller 27 in co-operation with the cam slot portion 50 effects appropriate adjustment of the fuel trimmer unit 12 through parts 31, 33, 36 and 37.

It will be seen from the foregoing description that there is provided a single control lever 13 for operating three control devices of a gas-turbine engine of the propeller-driving kind. One of the controls is of the kind which when rendered inoperative is capable of free movement without interfering with the operation of the device on which it effects the control operation, a second control which has two positions of adjustment only, and a third control which may be set in any position in a range. It will be further seen that whilst one of the controls is being actuated no actuation of the other controls is effected.

We claim:

1. In an operation control mechanism for a plurality of coacting units having variable dependence upon each other; a spindle, a link device reciprocable to operate one of said units and to rock said spindle, an arm extending laterally from said spindle and having a projection thereon and a rod extending from the arm intermediate the projection and the axis of said spindle, concentric first and second relatively rockable elements on an axis substantially parallel to said spindle axis, each of said rockable elements having a plate thereon, said first plate having two generally arcuate slots respectively accommodating part of said rod and said projection, said second plate having a generally arcuate slot entered by a second part of said rod, walls of the slot which accommodate said projection and the slot in said second plate each having cam contours and being engageable respectively with said projection and said part of said rod, linkage from one of said rockable elements to operate a second of said units, and linkage from the second of said rockable elements to operate another of said units.

2. In an operation control mechanism according to claim 1, wherein said plurality of coacting units are operated in the order mentioned for propeller control, fuel trimmer control, and shut-off cock control of a propeller-driving gas turbine engine.

References Cited in the file of this patent

UNITED STATES PATENTS

| | | |
|---|---|---|
| 691,968 | Paine | Jan. 28, 1902 |
| 2,154,887 | Baker | Apr. 18, 1939 |
| 2,460,693 | Hall | Feb. 1, 1949 |
| 2,851,898 | Hasty | Sept. 16, 1958 |
| 2,958,384 | Hull | Nov. 1, 1960 |
| 2,964,112 | Gunberg | Dec. 13, 1960 |